(12) United States Patent
Kehren et al.

(10) Patent No.: US 7,923,133 B2
(45) Date of Patent: Apr. 12, 2011

(54) COATINGS AND METHODS FOR PARTICLE REDUCTION

(75) Inventors: Jason M. Kehren, Woodbury, MN (US); Patricia M. Savu, Maplewood, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 112 days.

(21) Appl. No.: 12/326,629

(22) Filed: Dec. 2, 2008

(65) Prior Publication Data

US 2009/0162700 A1 Jun. 25, 2009

Related U.S. Application Data

(60) Provisional application No. 61/016,050, filed on Dec. 21, 2007.

(51) Int. Cl.
- *G11B 3/58* (2006.01)
- *B32B 7/12* (2006.01)
- *B32B 15/082* (2006.01)
- *B32B 27/28* (2006.01)

(52) U.S. Cl. ..... 428/814; 428/810; 428/343; 428/355 R; 428/355 AC; 428/421; 369/72

(58) Field of Classification Search ............ None
See application file for complete search history.

(56) References Cited

U.S. PATENT DOCUMENTS

| | | | |
|---|---|---|---|
| 5,030,701 A * | 7/1991 | Garbe | 526/245 |
| 6,671,132 B1 | 12/2003 | Crane et al. | |
| 6,894,105 B2 | 5/2005 | Parent et al. | |
| 6,930,861 B2 | 8/2005 | Huha et al. | |
| 6,995,222 B2 | 2/2006 | Buckanin et al. | |
| 7,035,055 B2 | 4/2006 | Kikkawa et al. | |
| 2002/0093766 A1 | 7/2002 | Wachtler | |
| 2003/0223154 A1 | 12/2003 | Yao | |
| 2008/0254321 A1 * | 10/2008 | Kehren et al. | 428/810 |

FOREIGN PATENT DOCUMENTS

| | | |
|---|---|---|
| DE | 4233388 A1 | 4/1994 |
| JP | 63 112824 A | 5/1988 |
| JP | 63 113925 A | 5/1988 |
| JP | 63 113926 A | 5/1988 |
| WO | WO 01/30873 A | 5/2001 |
| WO | WO 02/16517 | 2/2002 |
| WO | WO 2006/074079 A1 | 7/2006 |
| WO | WO-2006-074079 A1 * | 7/2006 |

OTHER PUBLICATIONS

Nielsen, Mechanical Properties of Polymers, 4th Edition Polymer Handbook, Reinhold, New York, 1962.

Monahan, Photolysis of Poly(Teri-Butyl Acrylate) in the Region of the Glass Transition Temperature, 4th Edition Polymer Handbook, J. Polym. Sci. A-1, 4, 2381-2390 (1966).

Encyclopedia Polymer Science and Technology, vol. 3, John Wiley and Sons Publishers, pp. 251.

* cited by examiner

*Primary Examiner* — Kevin M Bernatz
(74) *Attorney, Agent, or Firm* — Stephen F. Wolf

(57) ABSTRACT

The present disclosure relates to high purity apparati, e.g., magnetic hard disk drives, and more specifically, to coatings for particle reduction of surfaces of such apparati. The provided coatings include thin polymer coatings with reactive pendant groups having crosslinking functionality and ability to anchor to substrate surfaces to suppress particle shedding from substrate surfaces. Provided is a substrate that includes a coating on at least a portion of the substrate that comprises a fluorinated acrylate random copolymer. Methods of reducing particulate contamination are also provided.

19 Claims, No Drawings

COATINGS AND METHODS FOR PARTICLE REDUCTION

RELATED APPLICATIONS

This application claims priority to U.S. Provisional Patent Application No. 61/016,050, filed Dec. 21, 2007, which is incorporated herein by reference in its entirety.

FIELD

The present disclosure relates to high purity apparati, e.g., magnetic hard disk drives, and more specifically, to coatings for particle reduction in such apparati.

BACKGROUND

In magnetic disk drives and other high purity applications, particle contamination can cause a host of failure mechanisms. In these applications, it is highly desirable to minimize particles present in manufacturing and during application. Magnetic disk drives typically comprise a number of precisely dimensioned operating parts, e.g., spacers, disk clamps, e-blocks, cover plates, base plates, actuators, voice coils, voice coil plates, etc. These components can all be potential sources of particles. During drive operation, the head typically flies over the media at a spacing of about 100 Å. This spacing is decreasing with increasing areal density, making the reduction and prevention of particle generation ever more critical. Particles at the head disk interface can cause thermal asperities, high fly writes, and head crashes; any of these are detrimental to performance of a disk drive.

U.S. Pat. Publ. No. 2003/0223154 (Yao) discloses prevention of particle generation by encapsulation with a coating "made of a soft and tenacious material, such as gold, platinum, epoxy resin, etc." U.S. Pat. Publ. No. 2002/0093766 (Wachtler) discloses the use of adhesive-backed heat shrinkable conformal films to protect against particle generation. U.S. Pat. No. 6,671,132 (Crane et al.) discloses the use of metal or polymeric coatings. U.S. Pat. No. 7,035,055 (Kikkawa et al.) discloses the use of resin coatings. U.S. Pat. No. 6,903,861 (Huha et al.) discloses the use of certain polymer coatings as an encapsulant for microactuator components. PCT Publ. No. WO 2006/074079 (Kehren et al.) discloses the use of fluoropolymers comprising reactive pendant groups for particle suppression coatings.

Particles within hard drive assemblies can lead to friction and localized hot spots, which in turn can lead to failure of the hard drive and loss of the data magnetically encoded with it. One approach to this issue has been use of electroplated nickel as a particle suppression coating on the cover to the hard drive. However, nickel has tripled in price between about 2001 and about 2006. Also, the requirement to electroplate the hard drive cover leads to more steps in assembly than coating and curing of a low surface energy coating onto the hard drive assemblies, the electroplating process entails use of potentially hazardous materials, and particles shed from such coated parts are very hard, i.e., nickel particles, that can readily cause significant damage to the media and read/write head(s).

E-coats or electophoretically-deposited coatings are also used as particle suppression coatings but it can be difficult to obtain uniform coatings (necessitating some post coating machining). In addition, outgassing related to uncured monomers or absorption of hydrocarbons into the coatings that later outgas into the drive is encountered.

SUMMARY

The need exists for cheaper, more conveniently applied, high performance particle reduction coatings. Provided are improved coatings for particle suppression from substrates with oxide surfaces such as metals, e.g., aluminum, copper, stainless steel, etc., plastics, glass, ceramics, silicon, etc. The provided coatings can be applied with simple techniques (e.g., dip coating and thermal cure), exhibit thermal stability, can be formed in substantially uniform thin (e.g., from about 0.1 to about 5.0 microns) layers over complex substrate topographies. The coatings are clean (i.e., low outgassing, low extractable ions), are resistant to typical cleaning processes (e.g., aqueous and solvent-based cleaning solutions with or without ultrasonic treatment), are environmentally benign (i.e., delivered with solvents such as segregated hydrofluoroethers), have a good safety profile, and provide relatively superior cost-to-benefit performance as compared to the current industry method of nickel coating. The provided coatings may also provide corrosion protection.

The provided coatings comprise a thin polymer coating with reactive pendant groups having crosslinking functionality and superior ability to anchor to the substrate surface to suppress particle shedding from substrate surfaces. These particles can be from the substrate material or materials left over from processing and/or incomplete cleaning. This coating, in essence, forms a net over the surface of the substrate holding in particles, which otherwise could shed from the substrate.

In one aspect, provided is a substrate that includes a coating on at least a portion of said substrate wherein said coating comprises a fluorinated acrylate random copolymer having the following general formula:

$$XA_wB_xC_yD_zT$$

where X is the initiator residue or hydrogen, A represents units derived from one or more divalent fluorochemical acrylate monomers, B represents units derived from one or more divalent acrylate monomers with a functional group, C represents units derived from one or more non-fluorinated divalent acrylate monomers with a hydrocarbon group, D represents units derived from one or more curatives, T represents a functional terminal group or X defined as above, w is an integer from 1 up to about 200, x is an integer from 1 up to about 300, y is an integer from 1 up to about 100, and z is an integer from 0 up to about 30, and
wherein C is selected from the group consisting of monomers whose homopolymer has a glass transition temperature of less than or equal to 20° C.

In another aspect, provided is a method of reducing particulate contamination that includes providing at least one of a hard disk drive assembly, a MEMS device, a process equipment for electronics or a printed circuit card assembly, and applying a coating on at least a portion of the assembly of at least one of a hard disk drive assembly, a MEMS device, a process equipment for electronics or a printed circuit card assembly, wherein the coating comprises a fluorinated acrylate random copolymer having the following general formula:

$$XA_aB_bC_cD_dT_e$$

where X is the initiator residue or hydrogen, A represents units derived from one or more divalent fluorochemical acrylate monomers, B represents units derived from one or more divalent acrylate monomers with a functional group, C represents units derived from one or more non-fluorinated divalent acrylate monomers with a hydrocarbon group, D represents units derived from one or more curatives, T represents a functional terminal group or X defined as above, a+b+c+d+e=1, $0.20 \leq a \leq 0.90$, $0.05 \leq b \leq 0.25$, $0.05 \leq c \leq 0.65$, $0.0005 \leq d \leq 0.03$, and $0.0025 \leq e \leq 0.20$, wherein a, b, c, d, and e are weight percentages of A, B, C, D, and T, respectively, and wherein C is selected from the group consisting of monomers whose homopolymer has a glass transition temperature of less than or equal to 20° C.

In brief summary, the provided substrates, coatings, and methods comprise the reaction product of specified fluorochemical monomers and hydrocarbon monomers wherein the coating is at least partially cured in situ on the substrate. When at least partially cured in place, such coatings can provide surprisingly good performance as particle reduction coatings on substrates. Incorporation of hydrocarbon segments into the backbone of the copolymer has been surprisingly found to improve the particle suppression performance of the subject coatings and increase the resistance of resultant coatings to cleaning processes, particularly those processes used on electronics components such as ultrasonic cleaning processes. The provided coatings offer many advantages including but not limited to the ease of obtaining thin, uniform coating on complex surfaces, good safety and environmental properties, and resultant coatings that exhibit low surface energy. The provided coatings provides particle suppression coatings that are of relatively lower cost, provide improved resistance to cleaning, improved particle suppression performance. Improved handling and abrasion resistance has also been observed.

As used herein, "acrylate" can also be understood to mean "methacrylate"; and "pendant" refers to end groups and side groups.

GLOSSARY

As used herein the following abbreviations have the indicated meanings:

A174 is 3-trimethoxysilane propyl methacrylate;
AA is acrylic acid;
BA is butyl acrylate;
BuMA is butyl methacrylate;
EHA is 2-ethyl hexyl acrylate;
FBSEA is $C_4F_9SO_2N(CH_3)CH_2CH_2OC(O)CH=CH_2$ which can be made by the procedure of Examples 2A and 2B of PCT Application No. WO01/30873A (Savu et al.) which is incorporated herein by reference in its entirety;
FBSEMA is $C_4F_9SO_2N(CH_3)CH_2CH_2OC(O)C(CH3)=CH_2$ which can be made by the procedure as Examples 2A and 2B of PCT Application No. WO01/30873A;
HFE is hydrofluoroether;
HFPOMA is hexafluoropropylene oxide methacrylate which can be made by the procedure of Preparative Example 3 of U.S. Pat. No. 6,995,222 (Buckanin et al.) which is incorporated herein by reference in its entirety;
IOA is iso-octyl acrylate;
MMA is methylmethacrylate;
MPTS is 3-mercaptopropyl trimethoxysilane; and
PFPHMA is heptafluorobutyl methacrylate (i.e., $CF_3CF_2CF_2CH_2OC(O)C(CH3)=CH_2$) which can be made by the procedure described in PCT Application No. WO 02/16517 (Savu et al.) at page 15, lines 8-29, which is incorporated herein by reference in its entirety.

The above summary is not intended to describe each disclosed embodiment of every implementation of the present invention. The brief description of the drawing and the detailed description which follows more particularly exemplify illustrative embodiments.

DETAILED DESCRIPTION

In the following description, it is to be understood that other embodiments are contemplated and may be made without departing from the scope or spirit of the present invention. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

In one embodiment, coatings of the invention comprise fluorinated acrylate copolymer compounds of the following general formula:

$$XA_wB_xC_yD_zT$$

where X represents the residue of an initiator or hydrogen, A represents units derived from one or more divalent fluorochemical acrylate monomers, B represents units derived from one or more divalent acrylate monomers with a functional group, C represents units derived from one or more non-fluorinated divalent acrylate monomers with a hydrocarbon group (preferably BA), D represents units derived from one or more curatives, e.g., acidic acrylate (preferably acrylic acid), and T represents a functional terminal group or X as described above. The curative, D, may be present in the copolymer or may be provided as an external catalyst. The copolymer can be random, i.e., the order of the A, B, C and D segments is random though it will be understood that some local portions may exhibit a more block copolymer structure. The number average molecular weight of the copolymer is from about 500 to about 50,000, preferably from about 1000 to about 10,000.

The values w, x, y and z are as follows: w is an integer from 1 up to about 200, x is an integer from 1 up to about 300, y is an integer from 1 up to about 100, and z is an integer from 0 up to about 30 wherein the ratio of z:(x+1) is from 0 up to less than about 0.3. The ratio of the sum of (w+y):x is greater than about 1 and less than about 20, preferably greater than about 2 and less than about 8. The ratio of y:w is typically from 0 up to less than 7, preferably greater than about 0.2 and less than about 1.5. This ratio is also limited by solubility of the resultant copolymer. If the ratio is too high, the resultant copolymer will no longer be sufficiently soluble in HFE making such embodiments more difficult to use. Co-solvents can help extend this ratio. At relatively higher ratios, the resultant coating may subject to increased tendency to absorb and later emit, e.g., outgas, organic contaminants.

A can be derived from fluorinated acrylic monomers, preferably FBSEA, PFPHMA, and HFPOMA. Other suitable fluorinated monomers may be used instead or in addition to the preferred materials listed here if desired. In some embodiments, A is a unit derived from a monomer having the formula, $$R^fQOC(=O)C(R)=CH_2$$

where $R^f$ is a perfluoroalkyl or perfluoropolyether group having 1 to 30 carbon atoms, Q is a divalent linking group selected from the group consisting of —(CH$_2$)$_n$—, —(CH$_2$)$_n$— SO$_2$N(R')—, and —(CH$_2$)$_n$N(R")C(=O)—, where R' is —C$_n$H$_{(2n+1)}$, n is an integer from 1 to 6, and R" is hydrogen or CH$_3$.

B can be derived from a functionalized divalent acrylate monomer, e.g., silane-containing propyl acrylate or ethyl acrylate, epoxy acrylate, or a divalent urethane acrylate. A preferred example is A174. B can serve to provide crosslinking between polymers as well as bonding to the substrate.

The hydrocarbon segments, i.e., C in the formula above, impart improved softness to the resultant copolymer making the resultant particle suppression coating more resistant to thermal stresses and mechanical stresses. The C segment can be derived from monomers that are preferably those whose homopolymer has a low T$_g$, i.e., less than or equal to about 20° C. Illustrative examples of monomers suitable for use as C segments suitable for use in the present invention include methyl acrylate (CH$_2$=CHCOOCH$_3$, T$_g$=9 to 15° C.), butyl acrylate (CH$_2$=CHCOOC$_4$H$_9$, T$_g$=−54° C. as reported in 4th Edition Polymer Handbook, L. E. Nielsen, *Mechanical Properties of Polymers*, Reinhold, N.Y., 1962), isooctyl acrylate (T$_g$=−45° C. as reported in 4th Edition Polymer Handbook, A. R. Monahan, *J. Polym. Sci.* A-1, 4, 2381 (1966), and ethyl hexyl acrylate (T$_g$=−50° C. as reported in 4th Edition Polymer Handbook, A. R. Monahan, *J. Polym. Sci.* A-1, 4, 2381 (1966), and butyl methacrylate (T$_g$=20° C. as reported in *Encyclopedia Polymer Science and Technology*, Vol. 3, p. 251, John Wiley and Sons Publishers). The C segment preferably does not contain a reactive group. The C segment also preferably exhibits effective solubility in fluorocarbon solvents which are used in the preparation process of the random acrylic copolymer before cross-linking. Typically, HFEs are preferred for this purpose as their use offers a number of processing and environmental advantages as well as allows for thin uniform coatings even on complex surfaces. If desired, blends of fluorocarbons solvents with organic solvents (i.e. ethyl acetate, IPA, etc.) can be used to extend the range of C monomer segments that can be used.

To improve the curing performance, the polymer precursor composition may optionally include one or more curatives, i.e., D in the formula. Illustrative examples include acidic acrylates, e.g., acrylic acid, methacrylic acid, carboxy propyl acrylate, carboxylic acids, and sulfonic acids, e.g., 2-acrylamido-2-methylpropane sulfonic acid. The curative may be fluorinated or not as desired. Use of a curative is generally preferred; because it is incorporated into the reaction product, there is typically no outgassing.

When D is 0, the curing rate of the coating material may be enhanced as desired by addition of effective amounts of suitable catalyst depending upon the selection of reactive groups, parameters of the substrate, desired processing conditions, etc. For example, for coatings made using a perfluoropolyether silanes may be catalyzed using such agents as KRYTOX 157 FSL perfluoropolyalkylether carboxylic acid from DuPont.

T can be a functionalized terminal group, e.g., a silane. T can be derived from a chain transfer agent. A preferred agent is MPTS.

A free radical initiator is generally used to initiate the polymerization or oligomerization reaction. Commonly known free-radical initiators can be used and examples thereof include azo compounds, such as azobisisobutyronitrile (AIBN), azo-2-cyanovaleric acid and the like, hydroperoxides such as cumene, t-butyl and t-amyl hydroperoxide, dialkyl peroxides such as di-t-butyl and dicumylperoxide, peroxyesters such as t-butyl peroctoate, t-butylperbenzoate and di-t-butylperoxy phthalate, diacylperoxides such as benzoyl peroxide and lauroyl peroxide. Additionally, it is contemplated that compounds that generate free radicals or acidic and radical species upon exposure to actinic radiation can also be used to initiate the polymerization reaction. Examples of such species include IRGACURE 651 and DAROCUR 1173 available from Ciba.

Preferably, the substrate and coating are selected such that the coating can be anchored to the substrate surface via covalent bonding. The reactive pendant groups, i.e., silane groups, on the molecule can contribute to this desired bonding performance. In addition, while we do not wish to be bound by this theory, it is believed that the coating may provide superior corrosion protection as the silane groups react with bonds sites on the substrate that would otherwise be susceptible to corrosion reactions.

The coating thickness may be on the order of or substantially smaller than the size of the particles being held on the substrate, e.g., coating thickness in the range of from about 0.01 to about 1.0 micron as compared to an average particle size in the range of from about 0.1 to more than 5 microns. In the presence of water, alkoxy groups can react with the functional groups of the B and/or T unit to form a silanol group on the polymer. The silanol group can react with other silanol groups, thus crosslinking the polymer, and in the case of oxide surfaces (e.g., aluminum, copper, silicon, ceramic materials, etc.), covalently bonding the polymer to the surface.

An illustrative method of coating substrates in accordance with the invention is as follows:

a) mixing the precursor materials described above, i.e., initiator, acrylates, curative (if any), etc. in a suitable solvent, e.g., a hydrofluoroether and reacting the precursor materials to yield a coating composition containing the random copolymer;

b) applying the coating composition to desired portions of a substrate (any suitable coating technique can be used);

c) evaporating the solvent to leave the random copolymer on the substrate (an advantage of HFE solvents is that they will evaporate quickly);

d) elevating the temperature, e.g., to from about 100° C. to about 150° C., to cause the coating to cross link and build adhesion to the substrate.

In some applications it is preferred to use a two stage curing process. In this case, step d) is divided into two steps. In the first step, the coated substrate is cured so that the coating is tack-free, but has remaining reactive pendant groups. The coated substrate may then be run through additional processing. This may include addition of tapes, labels, epoxies or "form-in-place-gaskets". In the second step, the coated substrate is completely cured. This two stage cure can improve the adhesion of tapes, labels, epoxies and "form-in-place-gaskets. The curing in each step is preferably done at elevated temperatures. It has also been observed that superior results are typically achieved if the coating is cured by heating at a relatively lower temperature for longer time than if cured by heating at a higher temperature for shorter time, e.g., at about 120° C. rather than about 150° C. Subsequent adhesion to articles with coatings of the invention can be improved by wiping with a fluorochemical solvent shortly before bonding.

In another embodiment, provided is a method of reducing particulate contamination that includes providing at least one of a hard disk drive assembly, a MEMS device, a process equipment for electronics or a printed circuit card assembly; and applying a coating on at least a portion of the assembly of at least one of a hard disk drive assembly, a MEMS device, a process equipment for electronics or a printed circuit card assembly, wherein the coating comprises a fluorinated acrylate random copolymer having the following general formula:

$$XA_aB_bC_cD_dT_e$$

where X is the initiator residue or hydrogen, A represents units derived from one or more divalent fluorochemical acrylate monomers, B represents units derived from one or more divalent acrylate monomers with a functional group, C represents units derived from one or more non-fluorinated divalent acrylate monomers with a hydrocarbon group, D represents units derived from one or more curatives, T represents a functional terminal group or X defined as above, a+b+c+d+e=1; $0.20 \leq a \leq 0.90$, $0.05 \leq b \leq 0.25$, $0.05 \leq c \leq 0.65$, $0.0005 \leq d \leq 0.03$, and $0.0025 \leq e \leq 0.20$, wherein a, b, c, d, and e are weight percentages of A, B, C, D, and T, respectively, and wherein C is selected from the group consisting of monomers whose homopolymer has a glass transition temperature of less than or equal to 20° C. In some preferred embodiments, $0.40 \leq a \leq 0.80$ and $0.05 \leq c \leq 0.25$.

The provided coatings can be of use in a variety of high purity applications such in hard disk drive assemblies including such components as spacers, disk clamps, e-blocks, cover plates, base plates, microactuators, sliders, voice coils, voice coil plates etc. These components are all potential sources of particles in finished disk drive systems. Coatings of the invention may also be used to reduce particle shedding for MEMS (Micro Electrical-Mechanical Systems), high purity processing (coating process equipment to reduce potential contamination), and semiconductor processing applications, e.g., surface mount components on a printed circuit card assembly. In addition, coatings of the invention have been observed to impart anti-smudge and easy clean performance to substrates to which they are applied.

Objects and advantages of this invention are further illustrated by the following examples, but the particular materials and amounts thereof recited in these examples, as well as other conditions and details, should not be construed to unduly limit this invention.

EXAMPLES

Test Substrates: Aluminum (Al5052 H32) and stainless steel (SS304) sheets were purchased from M. Vincent & Associates of Minneapolis, Minn. and cut into test coupons approximately 51 mm×25 mm×1.6 mm in size for aluminum and 51 mm×25 mm×0.4 mm for stainless steel.

Cleaning Method 1: Prior to applying the coating, the substrates were cleaned by wipe cleaning using isopropyl alcohol (from EMD Chemicals of Gibbstown, N.J., part number PX1835P-4) and VWR SPEC-WIPE 7 Wipers (from VWR International, LLC of West Chester, Pa.).

Cleaning Method 2: Prior to coating, substrates were cleaned in two stages by vapor degreasing. In the first stage, a two sump vapor degreaser, model number 1012, obtained from Ultra-Kool, Inc. of Gilbertsville, Pa. was used to clean with 3M Novec HFE-72DA (from 3M Co. of St. Paul, Minn.) using the following parameters:
  30 seconds initial vapor rinse,
  300 seconds in the rinse sump with 40 kHz ultrasonics, and
  30 seconds final vapor rinse.

In the second stage, a two sump vapor degreaser, model number LAB-KLEEN 612 Degreasing System, from Unique Equipment Corporation of Montrose, Calif. was used to clean with an azeotrope of 89% (by weight) 3M NOVEC 7300 Engineered Fluid (from 3M Co. of St. Paul, Minn.) and 11% DOWANOL PM Propylene Glycol Methyl Ether (from Dow Chemical Company of Midland, Mich.) using the following parameters:
  30 seconds initial vapor rinse,
  300 seconds in the rinse sump with 40 kHz ultrasonics, and
  30 seconds final vapor rinse.

Coating Method: The coating was applied to the substrate by dip coating.

Determination of Percent Cure: A solvent extraction test method was used to determine if the coating crosslinked and adhered to the substrate. Prior to coating, the mass of the substrate was recorded ($M_{BC}$). The mass of the substrate after coating and curing was also recorded ($M_{AC}$). The substrate was then immersed in 3M™ NOVEC 7100 Engineering Fluid (methoxy-nonafluorobutane ($C_4F_9OCH_3$) from 3M Company of Saint Paul, Minn.) for 2 minutes. During this time the substrate was gently swirled in the solution. The mass of the substrate after solvent extraction was then recorded ($M_{SE}$). The extent of curing was then determined by the following calculation:

Percent Cure=$[(M_{SE}-M_{BC})/(M_{AC}-M_{BC})]*100$

This test was typically run on three substrate pieces for repeatability.

Particle Extraction Method: Liquid particle counter (LPC) extraction was used to determine the tendency of a substrate to shed particles. The test method used is based on IDEMA Microcontamination Standard M9-98.

All testing occurred in a clean hood with a class 100 environment. The water used throughout the testing was 18.2 MΩ (supplied using a NANOpure DIAMOND Analytical Ultrapure Water System from Barnstead International of Dubuque, Iowa, part number D11901) and filtered with an EMFLON II, 0.2 micron absolute filter (from Pall Corporation of East Hills, N.Y., part number DFA4001V002PV).

The test apparatus consisted of a 600 mL beaker (from VWR International, LLC of West Chester, Pa.) fixtured in an ultrasonic bath (from Crest Ultrasonics Corporation of Trenton, N.J., part number 6HT-1014-6T). The ultrasonics to the tank was supplied by a generator (from Crest Ultrasonics Corporation of Trenton, N.J., part number 6HT-1014-6W). The substrates to be tested were suspended in the beaker using a 28 gauge, solderable polyurethane stator wire (from MWS Wire Industries of Westlake Village, Calif., part number 28 SPN-155 RED) such that the neither the wire nor the substrate contact the beaker. The particle levels in the water were measured using an 8103 syringe sampling system (from Hach Ultra Analytics of Grants Pass, Oreg.).

For the testing, the beaker was filled with 500 mL of water. With the stator wire in the fluid, the beaker subjected to 30 seconds of 68 kHz ultrasonic treatment at 40 Watts per gallon. The particle levels in the fluid were measured by taking a 10 mL sample twice. The average of these results was used a blank. The substrate to be tested was then completely immersed in the water of the beaker and subjected to the same ultrasonic conditions described above. The particle levels in the fluid were then measured again using the same method as above. The particle counts generated per surface area of the substrate were calculated as follows:

Particle Counts=[(test sample particle count−blank particle count)*500 mL]/[substrate surface area]

The above procedure was repeated for three times for each substrate piece. The results presented below are for the third extraction.

Example 1

A copolymer was prepared by charging 25 g HFPOMA, 10 g BA (from Aldrich Chemical Company of Milwaukee, Wis.), 10 g A174 (from United Chemical Technologies of Bristol, N.J.), 5 g MPTS (from United Chemical Technologies, Inc.) and 250 g of 3M NOVEC 7200 Engineering Fluid (ethoxy-nonafluorobutane ($C_4F_9OC_2H_5$) from 3M Company, St. Paul, Minn.) to a flask equipped with a mixer. The solution was purged with nitrogen for 5 minutes. Following this, 1 g of LUPEROX 26M50 initiator (tert-butyl peroxy-2-ethylhexanoate, 50% solids, from Arkema, Inc. of Philadelphia, Pa.) was charged to the flask. The solution was stirred under nitrogen and heated to 65° C. for 18 hours. This solution was diluted to 10% polymer with 3M NOVEC 7200 Engineering Fluid. The polymer solution was catalyzed by adding KRYTOX 157 FSL (perfluoropolyalkylether carboxylic acid from E.I. du Pont De Nemours & Company of Deepwater, N.J.) at 2% of the polymer level, i.e., about 0.2% of the overall solution.)

Al5052 H32 test coupons were cleaned by Cleaning Method 1. These coupons were then coated with the polymer solution using the method described above using a pull rate of 2.54 millimeters/second (6 inches/minute). A two step cure was used with the first cure done at 85° C. for one hour and the second cure done at 150° C. for 1 hour. Solvent extraction testing showed 95% cure for coatings on the aluminum coupon. The LPC extraction results on for these coatings are presented in Table 1.

Example 2

A copolymer was prepared by charging 30 g HFPOMA, 5 g BA, 10 g A174, 5 g MPTS and 250 g of 3M NOVEC 7200 Engineering Fluid to a flask equipped with a mixer. The solution was purged with nitrogen for 5 minutes. Following this, 1 g of LUPEROX 26M50 initiator was charged to the flask. The solution was stirred under nitrogen and heated to 65° C. for 18 hours. This solution was diluted to 10% polymer with 3M NOVEC 7200 Engineering Fluid. The polymer solution was catalyzed by adding KRYTOX 157 FSL at 2% of the polymer level, about 0.2% of the overall solution.

Al5052 H32 test coupons were cleaned by Cleaning Method 1. These coupons were then coated with the polymer solution using the method described above using a pull rate of 2.54 millimeters/second (6 inches/minute). A two step cure was used with the first cure done at 85° C. for one hour and the second cure done at 150° C. for 1 hour. Solvent extraction testing showed 86% cure for coatings. The LPC extraction results on for these coatings are presented in Table 1.

Comparative Example 1

A copolymer was prepared by charging 35 g HFPOMA, 10 g A174, 5 g MPTS and 250 g of 3M™ NOVEC 7200 Engineering Fluid to a flask equipped with a mixer. The solution was purged with nitrogen for 5 minutes. Following this, 1 g of LUPEROX 26M50 initiator was charged to the flask. The solution was stirred under nitrogen and heated to 65° C. for 18 hours. This solution was diluted to 10% polymer with 3M NOVEC 7200 Engineering Fluid. The polymer solution was catalyzed by adding KRYTOX 157 FSL at 2% of the polymer level, i.e., about 0.2% of the overall solution.

Al5052 H32 test coupons were cleaned by Cleaning Method 1. These coupons were then coated with the polymer solution using the method described above using a pull rate of 2.54 millimeters/second (6 inches/minute). A two step cure was used with the first cure done at 85° C. for one hour and the second cure done at 150° C. for 1 hour. Solvent extraction testing showed 100% cure for coatings. The LPC extraction results for these coatings are presented in Table 1.

TABLE 1*

| | Substrate Al 5052 H32 | |
|---|---|---|
| | Particle Count** | % Particle Reduction |
| Control*** | 325,612 | — |
| Example 1 | 12,206 | 96% |
| Example 2 | 8,864 | 97% |
| Comparative Example 1 | 22,498 | 93% |

*Results are average of 5 samples
**Number of particles >0.3μ per $cm^2$ of substrate
***Control samples were aluminum coupons with no coating Analysis of the data in Table 1 showed Example 1 and Example 2 to have a statistically significant improvement in particle suppression over Comparative Example 1.

Example 3

A copolymer was prepared by charging 15 g FBSEA, 26 g BA, 4.5 g A174, 1.5 g MPTS, 3.0 g CN973J75 (from Sartomer Company, Inc. of Exton, Pa.), 100 g 3M™ NOVEC 7200 Engineering Fluid, and 100 g ethyl acetate (product number EX0241 from EMD Chemicals, Inc. of Gibbstown, N.J.) to a flask equipped with a mixer. The solution was purged with nitrogen for 5 minutes. Following this, 0.5 g of VAZO 67 (from DuPont) was charged to flask. The solution was stirred under nitrogen and was heated to 65° C. for 16 hours. The solution was diluted to 10% polymer with a 50/50 blend by mass of 3M™ NOVEC 7200 Engineering Fluid and ethyl acetate. The polymer solution was catalyzed by adding KRYTOX 157 FSL at 3% of the polymer level, i.e., about 0.3% of the overall solution.

Al5052 H32 and SS304 test coupons were cleaned by Cleaning Method 2. These coupons were then coated with the polymer solution using the method described above using a pull rate of 2.54 millimeters/second (6 inches/minute). A two step cure was used with the first cure done at 85° C. for one hour and the second cure done at 150° C. for 1 hour. Solvent extraction testing showed 79% cure on aluminum and 88% cure on stainless steel. The LPC extraction testing for this coating is presented in Table 2.

Example 4

A copolymer was prepared by charging 12 g FBSEA, 26 g BA, 4.5 g A174, 1.5 g MPTS, 6.0 g CN973J75, 100 g 3M NOVEC 7200 Engineering Fluid, and 100 g ethyl acetate to a flask equipped with a mixer. The solution was purged with nitrogen for 5 minutes. Following this, 0.5 g of VAZO 67 was charged to flask. The solution was stirred under nitrogen and was heated to 65° C. for 16 hours. The solution was diluted to 10% polymer with a 50/50 blend by mass of 3M™ NOVEC 7200 Engineering Fluid and ethyl acetate. The polymer solution was catalyzed by adding KRYTOX 157 FSL at 3% of the polymer level, i.e., about 0.3% of the overall solution.

Al5052 H32 and SS304 test coupons were cleaned by Cleaning Method 2. These coupons were then coated with the polymer solution using the method described above using a pull rate of 2.54 millimeters/second (6 inches/minute). A two step cure was used with the first cure done at 85° C. for one hour and the second cure done at 150° C. for 1 hour. Solvent extraction testing showed 78% cure on aluminum and 92% cure on stainless steel. The LPC extraction testing for this coating is presented in Table 2.

TABLE 2*

| | Substrate | | | |
|---|---|---|---|---|
| | Al5052 H32 | | SS304 | |
| | Particle Count** | % Particle Reduction | Particle Count** | % Particle Reduction |
| Control*** | 240,610 | — | 150,520 | — |
| Example 3 | 11,671 | 95% | 1.826 | 99% |
| Example 4 | 13,297 | 94% | 962 | 99% |

*Results are from a single sample
**Number of particles >0.3µ per cm² of substrate
***Control samples were coupons with no coating

Example 5

A copolymer was prepared by charging 54 g PFPHMA, 20 g BA, 18 g A174, 6 g MPTS, 2 g AA (from Alfa Aesar of Heysham, Lancashire LA3 2XY United Kingdom), 1 g 1-butyl peroctoate (LUPEROX 26, 100% active ingredient) (from Atofina of Philadelphia, Pa.), and 500 g 3M NOVEC 7200 Engineering Fluid to a flask under positive nitrogen pressure. The solution was stirred under nitrogen and was heated to 70° C. for 18 hours. The solution was diluted to 10% polymer by mass with 3M NOVEC 7200 Engineering Fluid.

Al5052 H32 and SS304 test coupons were cleaned by Cleaning Method 1. These coupons were then coated with the polymer solution using the method described above using a pull rate of 4.66 millimeters/second (11 inches/minute). The cure was done at 120° C. for 1 hour. Solvent extraction testing showed 97% cure on aluminum and 100% cure on stainless steel. The LPC extraction testing for this coating is presented in Table 3.

Example 6

A copolymer was prepared by charging 54 g PFPHMA, 20 g BA, 20 g A174, 4 g MPTS, 2 g mercaptopropionic acid (from Aldrich of Milwaukee, Wis.), 1 g t-butyl peroctoate (100%) and 500 g 3M NOVEC 7200 Engineering Fluid to a flask under positive nitrogen pressure. The solution was stirred under nitrogen and was heated to 70° C. for 18 hours. The solution was diluted to 10% polymer by mass with 3M NOVEC 7200 Engineering Fluid.

Al5052 H32 and SS304 test coupons were cleaned by Cleaning Method 1. These coupons were then coated with the polymer solution using the method described above using a pull rate of 4.66 millimeters/second (11 inches/minute). The cure was done at 120° C. for 1 hour. Solvent extraction testing showed 93% cure on aluminum and 95% cure on stainless steel. The LPC extraction testing for this coating is presented in Table 3.

Example 7

A copolymer was prepared by charging 54 g FBSEA, 20 g BA, 18 g A174, 6 g MPTS, 2 g AA, 1 g t-butyl peroctoate (LUPEROX 26), and 500 g 3M NOVEC 7200 Engineering Fluid to a flask under positive nitrogen pressure. The solution was stirred under nitrogen and was heated to 70° C. for 18 hours. The solution was diluted to 10% polymer by mass with 3M™ NOVEC 7200 Engineering Fluid.

Al5052 H32 and SS304 test coupons were cleaned by Cleaning Method 1. These coupons were then coated with the polymer solution using the method described above using a pull rate of 4.66 millimeters/second (11 inches/minute). The cure was done at 120° C. for 1 hour. Solvent extraction testing showed 95% cure on aluminum and 100% cure on stainless steel. The LPC extraction testing for this coating is presented in Table 3.

Example 8

A copolymer was prepared by charging 54 g FBSEMA, 20 g BA, 18 g A174, 6 g MPTS, 2 g AA, 1 g t-butyl peroctoate (LUPEROX 26), 450 g 3M NOVEC 7200 Engineering Fluid and 50 g of ethyl acetate to a flask under positive nitrogen pressure. The solution was stirred under nitrogen and was heated to 70° C. for 18 hours. The solution was diluted to 10% polymer by mass with 3M NOVEC 7200 Engineering Fluid.

Al5052 H32 and SS304 test coupons were cleaned by Cleaning Method 1. These coupons were then coated with the polymer solution using the method described above using a pull rate of 4.66 millimeters/second (11 inches/minute). The cure was done at 120° C. for 1 hour. Solvent extraction testing showed 100% cure on aluminum and 100% cure on stainless steel. The LPC extraction testing for this coating is presented in Table 3.

Example 9

A copolymer was prepared by charging 54 g PFPHMA, 20 g BA, 19 g A174, 6 g MPTS, 1 g AA, 1 g t-butyl peroctoate (LUPEROX 26), and 500 g 3M NOVEC 7200 Engineering Fluid to a flask under positive nitrogen pressure. The solution was stirred under nitrogen and was heated to 70° C. for 18 hours. The solution was diluted to 10% polymer by mass with 3M NOVEC 7200 Engineering Fluid.

Al5052 H32 and SS304 test coupons were cleaned by Cleaning Method 1. These coupons were then coated with the polymer solution using the method described above using a pull rate of 4.66 millimeters/second (11 inches/minute). The cure was done at 120° C. for 1 hour. Solvent extraction testing showed 90% cure on aluminum and 92% cure on stainless steel. The LPC extraction testing for this coating is presented in Table 3.

Example 10

A copolymer was prepared by charging 54 g PFPHMA, 20 g EHA (from Aldrich), 18 g A174, 6 g MPTS, 2 g AA, 1 g t-butyl peroctoate (LUPEROX 26), and 500 g 3M NOVEC 7200 Engineering Fluid to a flask under positive nitrogen pressure. The solution was stirred under nitrogen and was heated to 70° C. for 18 hours. The solution was diluted to 10% polymer by mass with 3M NOVEC 7200 Engineering Fluid.

Al5052 H32 and SS304 test coupons were cleaned by Cleaning Method 1. These coupons were then coated with the polymer solution using the method described above using a pull rate of 4.66 millimeters/second (11 inches/minute). The cure was done at 120° C. for 1 hour. Solvent extraction testing showed 100% cure on aluminum and 97% cure on stainless steel. The LPC extraction testing for this coating is presented in Table 3.

Example 11

A copolymer was prepared by charging 54 g PFPHMA, 20 g IOA (from Aldrich), 18 g A174, 6 g MPTS, 2 g AA, 1 g t-butyl peroctoate (LUPEROX 26), and 500 g 3M NOVEC 7200 Engineering Fluid to a flask under positive nitrogen pressure. The solution was stirred under nitrogen and was heated to 70° C. for 18 hours. The solution was diluted to 10% polymer by mass with 3M NOVEC 7200 Engineering Fluid.

Al5052 H32 and SS304 test coupons were cleaned by Cleaning Method 1. These coupons were then coated with the polymer solution using the method described above using a pull rate of 4.66 millimeters/second (11 inches/minute). The cure was done at 120° C. for 1 hour. Solvent extraction testing showed 98% cure on aluminum and 100% cure on stainless steel. The LPC extraction testing for this coating is presented in Table 3.

TABLE 3*

| | Substrate | | | |
| --- | --- | --- | --- | --- |
| | Al5052 H32 | | SS304 | |
| | Particle Count** | % Particle Reduction | Particle Count** | % Particle Reduction |
| Control*** | 309,063 | — | 148,912 | — |
| Example 5 | 43,986 | 86% | 8,709 | 94% |
| Example 6 | 16,330 | 95% | 4,922 | 97% |
| Example 7 | 26,184 | 92% | 6,436 | 96% |
| Example 8 | 28,135 | 91% | 2,775 | 98% |
| Example 9 | 17,801 | 94% | 4,196 | 97% |
| Example 10 | 28,222 | 91% | 3,472 | 98% |
| Example 11 | 10,621 | 97% | 1,673 | 99% |

*Results are from a single sample
**Number of particles >0.3µ per cm$^2$ of substrate
***Control samples were coupons with no coating Comparative Example 2

A copolymer was prepared by charging 54 g PFPHMA, 20 g MMA (from Rohm and Haas of Philadelphia, Pa.), 19 g A174, 6 g MPTS, 1 g AA, 1 g t-butyl peroctoate (LUPEROX 26), and 500 g 3M NOVEC 7200 Engineering Fluid to a flask under positive nitrogen pressure. The solution was stirred under nitrogen and was heated to 70° C. for 18 hours. The solution was diluted to 10% polymer by mass with 3M NOVEC 7200 Engineering Fluid.

Al5052 H32 test coupons were cleaned by Cleaning Method 1. These coupons were then coated with the polymer solution using the method described above with using a pull rate of 4.66 millimeters/second (11 inches/minute). The cure was done at 120° C. for 1 hour. Solvent extraction testing showed 98% cure. The LPC extraction testing for this coating is presented in Table 4.

Comparative Example 3

A copolymer was prepared by charging 54 g FBSEA, 20 g MMA, 19 g A174, 6 g MPTS, 1 g AA, 1 g t-butyl peroctoate (LUPEROX 26), and 500 g 3M NOVEC™ 7200 Engineering Fluid to a flask under positive nitrogen pressure. The solution was stirred under nitrogen and was heated to 70° C. for 18 hours. The solution was diluted to 10% polymer by mass with 3M NOVEC 7200 Engineering Fluid.

Al5052 H32 test coupons were cleaned by Cleaning Method 1. These coupons were then coated with the polymer solution using the method described above with using a pull rate of 4.66 millimeters/second (11 inches/minute). The cure was done at 120° C. for 1 hour. Solvent extraction testing showed 94% cure. The LPC extraction testing for this coating is presented in Table 4.

Example 12

A copolymer was prepared by charging 54 g PFPHMA, 20 g BA, 19 g A174, 6 g MPTS, 1 g AA, 1 g t-butyl peroctoate (LUPEROX 26), and 500 g 3M NOVEC 7200 Engineering Fluid to a flask under positive nitrogen pressure. The solution was stirred under nitrogen and was heated to 70° C. for 18 hours. The solution was diluted to 10% polymer by mass with 3M NOVEC 7200 Engineering Fluid.

Al5052 H32 test coupons were cleaned by Cleaning Method 1. These coupons were then coated with the polymer solution using the method described above with using a pull rate of 4.66 millimeters/second (11 inches/minute). The cure was done at 120° C. for 1 hour.
Solvent extraction testing showed 86% cure. The LPC extraction testing for this coating is presented in Table 4.

Example 13

A copolymer was prepared by charging 54 g FBSEA, 20 gBuMA (from Lucite International of Southampton SO14 3BP, United Kingdom), 19 g A174, 6 g MPTS, 1 g AA, 1 g t-butyl peroctoate (LUPEROX 26), and 500 g 3M NOVEC 7200 Engineering Fluid to a flask under positive nitrogen pressure. The solution was stirred under nitrogen and was heated to 70° C. for 18 hours. The solution was diluted to 10% polymer by mass with 3M™ NOVEC 7200 Engineering Fluid.

Al5052 H32 test coupons were cleaned by Cleaning Method 1. These coupons were then coated with the polymer solution using the method described above with using a pull rate of 4.66 millimeters/second (11 inches/minute). The cure was done at 120° C. for 1 hour.
Solvent extraction testing showed 89% cure. The LPC extraction testing for this coating is presented in Table 4.

Example 14

A copolymer was prepared by charging 54 g PFPHMA, 20 g BuMA, 19 g A174, 6 g MPTS, 1 g AA, 1 g t-butyl peroctoate (LUPEROX 26), and 500 g 3M NOVEC 7200 Engineering Fluid to a flask under positive nitrogen pressure. The solution was stirred under nitrogen and was heated to 70° C. for 18 hours. The solution was diluted to 10% polymer by mass with 3M™ NOVEC 7200 Engineering Fluid.

Al5052 H32 test coupons were cleaned by Cleaning Method 1. These coupons were then coated with the polymer solution using the method described above with using a pull rate of 4.66 millimeters/second (11 inches/minute). The cure was done at 120° C. for 1 hour. Solvent extraction testing showed 89% cure. The LPC extraction testing for this coating is presented in Table 4.

TABLE 4*

| | Substrate Al 5052 H32 | |
| --- | --- | --- |
| | Particle Count** | % Particle Reduction |
| Control*** | 287,684 | — |
| Example 12 | 17,567 | 94% |
| Comparative Example 2 | 57,866 | 80% |
| Comparative Example 3 | 83,810 | 71% |
| Example 13 | 41,712 | 86% |
| Example 14 | 21,729 | 92% |

*Results are average of 3 samples, with the exception of Example 12 which is the average of 2 samples.
**Number of particles >0.3µ per cm$^2$ of substrate
***Control samples were aluminum coupons with no coating Comparative Example 4

A copolymer was prepared by charging 54 g PFPHMA, 20 g BuMA, 19 g A174, 6 g MPTS, 1 g t-butyl peroctoate (LUPEROX 26), and 500 g 3M NOVEC 7200 Engineering Fluid to a flask under positive nitrogen pressure. The solution was stirred under nitrogen and was heated to 70° C. for 18 hours. The solution was diluted to 10% polymer by mass with 3M™ NOVEC 7200 Engineering Fluid.

Al5052 H32 test coupons were cleaned by Cleaning Method 1. These coupons were then coated with the polymer solution using the method described above with using a pull rate of 4.66 millimeters/second (11 inches/minute). The coated coupons were heated at 120° C. for 1 hour. Solvent extraction testing showed 0% cure.

Example 15

A copolymer was prepared by charging 54 g PFPHMA, 20 g BA, 19.5 g A174, 6 g MPTS, 0.5 g AA, 1 g t-butyl peroctoate (LUPEROX 26), and 500 g 3M NOVEC 7200 Engineering Fluid to a flask under positive nitrogen pressure. The solution was stirred under nitrogen and was heated to 70° C. for 18 hours. The solution was diluted to 10% polymer by mass with 3M NOVEC 7200 Engineering Fluid.

Al5052 H32 test coupons were cleaned by Cleaning Method 1. These coupons were then coated with the polymer solution using the method described above with using a pull rate of 4.66 millimeters/second (11 inches/minute). Three types of cures were run. The solvent extraction data is presented in Table 5.

Example 16

A copolymer was prepared by charging 54 g PFPHMA, 20 g BA, 19.7 g A174, 6 g MPTS, 0.3 g AA, 1 g t-butyl peroctoate (LUPEROX 26), and 500 g 3M NOVEC 7200 Engineering Fluid to a flask under positive nitrogen pressure. The solution was stirred under nitrogen and was heated to 70° C. for 18 hours. The solution was diluted to 10% polymer by mass with 3M™ NOVEC 7200 Engineering Fluid.

Al5052 H32 test coupons were cleaned by Cleaning Method 1. These coupons were then coated with the polymer solution using the method described above with using a pull rate of 4.66 millimeters/second (11 inches/minute). Three types of cures were run. The solvent extraction data is presented in Table 5.

TABLE 5*

| | Substrate Al 5052 H32 | |
| --- | --- | --- |
| | Cure Conditions | Percent Cure |
| Example 15 | 120° C., 1 hour | 73% |
| | 120° C., 3 hours | 81% |
| | 150° C., 1 hour | 100% |
| Example 16 | 120° C., 1 hour | 41% |
| | 120° C., 3 hours | 71% |
| | 150° C., 1 hour | 92% |

*Results are average of 3 samples

Example 17

A copolymer was prepared by charging 54 g PFPHMA, 20 g BA, 19.5 g A174, 6 g MPTS, 0.5 g AA, 0.22 g of polymerizable dye AD-4 (U.S. Pat. No. 6,894,105 (Parent et al.), Column 9 and 22 line 44), 2 g t-butyl peroctoate (LUPEROX 26), and 500 g 3M NOVEC 7200 Engineering Fluid to a flask under positive nitrogen pressure. The solution was stirred under nitrogen and was heated to 70° C. for 18 hours. The solution was filtered through a 0.1 micron nylon filter and was diluted to 10% polymer by mass with 3M™ NOVEC 7200 Engineering Fluid.

Al5052 H32 test coupons were cleaned by Cleaning Method 1. These coupons were then coated with the polymer solution using the method described above with using a pull rate of 4.66 millimeters/second (11 inches/minute). The cure was done at 150° C. for 1 hour.

Solvent extraction testing showed 92% cure. The LPC extraction testing for this coating is presented in Table 6.

TABLE 6*

| | Substrate Al 5052 H32 | |
| --- | --- | --- |
| | Particle Count** | % Particle Reduction |
| Control*** | 386,800 | — |
| Example 17 | 4,900 | 99% |

*Results are average of 3 samples
**Number of particles >0.3μ per cm$^2$ of substrate
***Control samples were aluminum coupons with no coating Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

What is claimed is:

1. A substrate comprising a coating on at least a portion of said substrate wherein said coating comprises a fluorinated acrylate random copolymer having the following general formula:

$$XA_wB_xC_yD_zT$$

where
X is the initiator residue or hydrogen,
A represents units derived from one or more divalent fluorochemical acrylate monomers,
B represents units derived from one or more divalent acrylate monomers with a functional group,
C represents units derived from one or more non-fluorinated divalent acrylate monomers with a hydrocarbon group,
D represents units derived from one or more curatives,
T represents a functional terminal group or X defined as above,
w is an integer from 1 up to about 200,
x is an integer from 1 up to about 300,
y is an integer from 1 up to about 100, and
z is an integer from 0 up to about 30, and
wherein C is selected from the group consisting of monomers whose homopolymer has a glass transition temperature of −45° C. or lower.

2. The substrate of claim 1 wherein A is a unit derived from a monomer selected from the group consisting of $$R^fQOC(=O)C(R)=CH_2$$

where $R^f$ is a perfluoroalkyl or perfluoropolyether group having 1 to 30 carbon atoms, Q is a divalent linking group selected from the group consisting of $-(CH_2)_n-$, $-(CH_2)_n-SO_2N(R)-$, and $-(CH_2)_nN(R'')C(=O)-$, where R is H or $CH_3$, R' is $-C_nH_{(2n+1)}$, n is an integer from 1 to 6, and R'' is hydrogen or $CH_3$.

3. The substrate of claim 1 wherein B is a unit derived from a silane-containing acrylic monomer.

4. The substrate of claim 3 wherein B is a unit derived from 3-trimethoxysilane propyl methacrylate.

5. The substrate of claim 1 wherein C is a unit derived from a monomer selected from the group consisting of butyl acrylate, iso-octyl acrylate, and 2-(ethyl)-hexyl acrylate.

6. The substrate of claim 1 wherein D is a unit derived from an acidic curative.

7. The substrate of claim 6 wherein the acidic curative comprises acidic acid.

8. The substrate of claim 1 wherein T is a unit derived from a monomer comprising a silane-containing mercaptan.

9. The substrate of claim 8 wherein T is a unit derived from 3-mercaptopropyl trimethoxysilane.

10. The substrate of claim 1 wherein the number average molecular weight ($M_w$) of said copolymer is from about 500 to about 50,000.

11. The substrate of claim 1 wherein the ratio z:(x+1) is from 0 to less than about 0.3.

12. The substrate of claim 1 wherein the ratio of y:w is greater than 0 and less than 7.

13. The substrate of claim 1 wherein the ratio of (w+y):x is greater than 1 and less than 20.

14. The substrate of claim 1 wherein said substrate is a hard disk drive assembly comprising at least one head associated with a disk surface for storing computer data magnetically on the disk.

15. The substrate of claim 1 wherein the copolymer further comprises a unit derived from one or more (meth)acrylate functional dyes.

16. A method of reducing particulate contamination comprising:
    providing at least one of a hard disk drive assembly, a MEMS device, a process equipment for electronics or a printed circuit card assembly; and
    applying a coating on at least a portion of the assembly of at least one of a hard disk drive assembly, a MEMS device, a process equipment for electronics or a printed circuit card assembly,
wherein the coating comprises a fluorinated acrylate random copolymer having the following general formula:

$$XA_aB_bC_cD_dT_e$$

where
   X is the initiator residue or hydrogen,
   A represents units derived from one or more divalent fluorochemical acrylate monomers,
   B represents units derived from one or more divalent acrylate monomers with a functional group,
   C represents units derived from one or more non-fluorinated divalent acrylate monomers with a hydrocarbon group,
   D represents units derived from one or more curatives,
   T represents a functional terminal group or X defined as above,
   $a+b+c+d+e=1$, $0.20 \leq a \leq 0.90$, $0.05 \leq b \leq 0.25$, $0.05 \leq c \leq 0.65$, $0.0005 \leq d \leq 0.03$, and $0.0025 \leq e \leq 0.20$,
wherein a, b, c, d, and e are weight percentages of A, B, C, D, and T, respectively, and
wherein C is selected from the group consisting of monomers whose homopolymer has a glass transition temperature of −45° C. or lower.

17. The method of claim 16 wherein, $0.40 \leq a \leq 0.80$ and $0.05 \leq c \leq 0.25$.

18. The method of claim 16 wherein the hard disk assembly comprises at least one component selected from spacers, disk clamps, e-blocks, cover plates, base plates, microactuators, sliders, voice coils, or voice coil plates.

19. The method of claim 16 wherein the copolymer further comprises a unit derived from one or more (meth)acrylate functional dyes.

* * * * *

UNITED STATES PATENT AND TRADEMARK OFFICE
CERTIFICATE OF CORRECTION

PATENT NO.         : 7,923,133 B2
APPLICATION NO.    : 12/326629
DATED              : April 12, 2011
INVENTOR(S)        : Jason Michael Kehren et al.

It is certified that error appears in the above-identified patent and that said Letters Patent is hereby corrected as shown below:

Column 11,
Lines 20-21, delete "1-butyl" and insert --t-butyl-- therefor.

Column 16,
Line 65, in Claim 2, delete "–SO$_2$N(R)–," and insert -- –SO$_2$N(R')–,-- therefor.

Signed and Sealed this
Twenty-ninth Day of May, 2012

David J. Kappos
*Director of the United States Patent and Trademark Office*